United States Patent
Takahashi et al.

(10) Patent No.: US 7,762,159 B2
(45) Date of Patent: Jul. 27, 2010

(54) STEERING SWITCH FOR VEHICLE

(75) Inventors: Atsuo Takahashi, Miyagi-ken (JP);
Tatsuya Yokoyama, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 692 days.

(21) Appl. No.: 10/645,249

(22) Filed: Aug. 21, 2003

(65) Prior Publication Data

US 2004/0050673 A1 Mar. 18, 2004

(30) Foreign Application Priority Data

| Aug. 28, 2002 | (JP) | 2002-249082 |
| Aug. 28, 2002 | (JP) | 2002-249096 |
| Sep. 3, 2002 | (JP) | 2002-257707 |
| Sep. 3, 2002 | (JP) | 2002-257772 |
| Oct. 23, 2002 | (JP) | 2002-308442 |

(51) Int. Cl.
*B62D 1/04* (2006.01)
*G05G 1/10* (2006.01)
*G05G 11/00* (2006.01)
*G05G 13/00* (2006.01)

(52) U.S. Cl. ................... 74/552; 74/484 R
(58) Field of Classification Search .......... 74/473.3, 74/473.12, 473.1, 473.19, 473.21, 473.35, 74/484 R, 552; 200/61.54, 61.57
See application file for complete search history.

(56) References Cited

U.S. PATENT DOCUMENTS

| 5,520,066 | A | 5/1996 | Tueri |
| 5,855,144 | A | 1/1999 | Parada |
| 6,131,946 | A * | 10/2000 | Castleman et al. ........... 280/731 |
| 6,225,578 | B1 | 5/2001 | Kobayashi et al. |
| 6,268,576 | B1 | 7/2001 | Onodera |
| 6,349,616 | B1 * | 2/2002 | Onodera et al. ............ 74/552 |
| 6,437,265 | B1 * | 8/2002 | Kreuzer ................... 200/61.54 |
| 6,453,769 | B2 * | 9/2002 | Sakurai ....................... 74/552 |
| 6,525,283 | B2 | 2/2003 | Leng |
| 6,626,062 | B1 | 9/2003 | Yoshitake et al. |

(Continued)

FOREIGN PATENT DOCUMENTS

DE 195 11 878 A1 10/1996

(Continued)

OTHER PUBLICATIONS

Search Report dated Mar. 10, 2006 for corresponding European Application No. 03 019 458.3.

*Primary Examiner*—Thomas R Hannon
*Assistant Examiner*—Justin Krause
(74) *Attorney, Agent, or Firm*—Brinks Hofer Gilson & Lione

(57) ABSTRACT

Rotary support bodies which support both ends of a rod penetrating a manipulating knob body are formed by joining a first rotary support member which is arranged at one side of the manipulating knob body and supports one end of the rod and a second rotary support member which is arranged at another side of the manipulating knob body and supports another end of the rod, and one end of the rod is fixed to the second rotary support member, and another end of the rod is engaged with the first rotary support member. Accordingly, a manipulating knob can be mounted on a casing in a state the manipulating knob is mounted on the rotary support body.

15 Claims, 9 Drawing Sheets

U.S. PATENT DOCUMENTS

| | | | | |
|---|---|---|---|---|
| 2001/0037931 A1* | 11/2001 | Takahashi | | 200/61.54 |
| 2002/0033321 A1* | 3/2002 | Miyako et al. | | 200/61.54 |
| 2002/0066658 A1* | 6/2002 | Agetsuma | | 200/61.54 |
| 2003/0061896 A1* | 4/2003 | Takai et al. | | 74/473.12 |

FOREIGN PATENT DOCUMENTS

| | | |
|---|---|---|
| DE | 100 41 590 | 4/2001 |
| DE | 100 41 590 A1 | 4/2001 |
| EP | 0 876 940 | 11/1998 |
| EP | 0 876 940 A2 | 11/1998 |
| EP | 1 065 104 | 1/2001 |
| EP | 1 188 638 A1 | 3/2002 |
| EP | 1 211 119 | 6/2002 |
| EP | 1 211 119 A2 | 6/2002 |
| EP | 1 211 119 A3 | 11/2003 |
| FR | 2 792 085 | 10/2000 |

* cited by examiner

STEERING SWITCH FOR VEHICLE

BACKGROUND OF THE INVENTION

1. Field of the Invention

The present invention relates to a steering switch for a vehicle which is mounted on a steering wheel of an automobile and is served for manipulating various equipment such as an automatic transmission.

2. Description of the Related Art

Conventionally, with respect to a steering wheel of an automobile, there has been known a steering wheel which mounts a plurality of steering switches at arbitrary positions. In this type of steering switch, in the midst of traveling in a drive range, an automatic transmission is manually shifted up by rotating a manipulating knob at a neutral position to a back-side from a front side of the steering wheel, while the automatic transmission is manually shifted down by rotating a manipulating knob at a neutral position to the front side from the back side of the steering wheel.

As a conventional steering switch for a vehicle of this type, a steering switch for a vehicle disclosed in Japanese Unexamined Patent Publication 2002-166832 is known.

The conventional steering switch for a vehicle disclosed in this publication includes a support member which is fixed to a central pad of a steering wheel, a manipulating knob which is connected to the support member such that the manipulating knob is rotatable in the front and rear directions of the steering wheel, the manipulating knob projecting inside a space surrounded by the ring of the steering wheel and the pad, biasing means which biases the manipulating knob such that the manipulating knob returns to a neutral position, and signal changeover means which is capable of changing over two kinds of electric signals in response to the rotational direction of the manipulating knob from the neutral position.

A rotary slider is integrally mounted on the manipulating knob, wherein the rotary slider has a shaft hole in which one end of a connecting pin which functions as a rotary shaft of the manipulating knob is inserted and, at the same time, a knob body having a shaft hole in which other end of the connecting pin is inserted is mounted on the manipulating knob. Further, a shaft hole in which an intermediate portion of the connecting pin is inserted is formed in the support member.

That is, with respect to the manipulating knob and the support member, in a state that the support member is arranged between the rotary slider and the knob body, by inserting the connecting pin into respective shaft holes formed in the rotary slider, the support member and the knob body, the manipulating knob is rotatably connected to the support member.

The biasing means includes a recess formed in the knob body, a holder housed in the recess, a spring and a ball housed in the holder, and a cam face formed on a portion of the support member which faces the knob body in an opposed manner, wherein the ball is brought into pressure contact with the cam face due to a repulsive force of the spring so as to make the manipulating knob return to a neutral position.

The signal changeover means includes a printed circuit board which is mounted on the support member and on which conductive patterns made up of a resistance pattern for changing over two kinds of signals and a collector pattern are formed and a slide contact which is mounted on the rotary slider which is rotated along with the rotation of the manipulating knob and slides over the conductive pattern of the printed circuit board.

Further, as the manipulating knob and the support member, there has been known a structure in which two casing members having openings have their openings abut to each other at plural portions using a snap engagement. This structure is configured such that a support structure which rotatably supports the manipulating knob, biasing means and signal changeover means are housed in a hollow formed by two casing members.

As described above, in the conventional steering switch for a vehicle, the printed circuit board of the signal changeover means is mounted on the support member and the slide contact which slides on the printed circuit board is mounted on the rotary slider which is integrally mounted on the manipulating knob. Further, the cam face of the biasing means is formed on the support member and the spring, the ball and the holder are housed in the recess formed in the knob body of the manipulating knob. Further, with respect to the manipulating knob and the support member, by arranging the support member between the rotary slider and the knob body of the manipulating knob and by inserting the connecting pin into the rotary slider, the support member and the knob body respectively, the manipulating knob is rotatably connected to the support member. That is, in the conventional steering switch for a vehicle, at the time of assembling, it is necessary to perform the operation to set the biasing means and the signal changeover means and the operation to mount the manipulating knob to the support member simultaneously, there has been a drawback that the assembling operation becomes complicated.

The present invention has been made in view of the above-mentioned drawbacks of the prior art and it is a first object of the present invention to provide a steering switch for a vehicle which can easily mount a manipulating knob to a support member which is mounted on a steering wheel.

Further, on a steering wheel, besides the above-mentioned steering switch for a vehicle, switches for manipulating various equipment provided to an automobile are mounted. Accordingly, there has been a demand for miniaturization of the steering switch for a vehicle to obviate a drawback that due to mounting of the steering switch for a vehicle to the steering wheel, a mounting space for a plurality of switches is limited.

SUMMARY OF THE INVENTION

However, in the above-mentioned conventional steering switch for a vehicle, the printed circuit board, the slide contact and the manipulating knob which are mounted on the support member are arranged linearly and, at the same time, the manipulating knob, the spring which constitutes the biasing means, the ball, the holder and the cam face formed on the support member are arranged linearly. Accordingly, the dimension of the steering switch for a vehicle in the extension direction of the manipulating knob with respect to the support member is liable to become large and hence, there is possibility that the mounting space for other switches is limited.

The present invention has been made in view of the above-mentioned circumstances and it is a second object of the present invention to provide a steering switch for a vehicle which can be miniaturized.

Further, in the inside of a conventional automobile, besides a steering switch for a vehicle for shifting up or down an automatic transmission manually by manipulating a manipulating knob, a plurality of switches for operating various equipment are mounted. Accordingly, there has been a demand for realization of a steering switch for a vehicle which integrates a plurality of switches such that a plurality of switches can be manipulated while allowing a driver to keep on gripping the steering wheel. However, when a plurality of switches are integrally formed, wiring for transmitting electric signals outputted from these switches to the outside becomes complicated and hence, the wiring operation at the time of assembling the steering switch for a vehicle becomes complicated.

It is a third object of the present invention to provide a steering switch for a vehicle which is made in view of the above-mentioned circumstances and can facilitate the wiring operation of the steering switch which includes a plurality of switches.

Still further, in the above-mentioned conventional steering switch for a vehicle, since the manipulating knob and the support member are constituted by joining two casing members at a plurality of portions by snap engagement, the disassembling is difficult and hence, when the joined state by the snap engagement is forcibly released, the case member breaks down. Accordingly, there has been a demand for a steering switch for a vehicle which can be easily disassembled when a mechanical trouble or an electrical trouble occurs on the steering switch for a vehicle.

The present invention has been made in view of the above-mentioned circumstances and it is a fourth object of the present invention to provide a steering switch for a vehicle which facilitates the disassembling operation thereof.

To achieve the above-mentioned first object of the present invention, a steering switch for a vehicle according to the first invention comprises:

a support member which is mounted on a steering wheel, the steering wheel having an annular ring and at least one spoke formed inside the ring;

a manipulating knob which is rotatably supported on the steering wheel such that the manipulating knob is rotatable in front and rear directions of the support member, the manipulating knob projecting inside a space surrounded by the ring and the spoke;

a rotary support body which is mounted on the support member and rotatably supports the manipulating knob;

biasing means which bias the manipulating knob such that the manipulating knob returns to a neutral position; and signal changeover means which are capable of changing over two kinds of electric signals in response to a rotational direction of the manipulating knob from the neutral position, wherein a fulcrum of rotation of the manipulating knob is provided by supporting both ends of a rod which is inserted into the manipulating knob using the rotary support body, the rotary support body is constituted by joining a first rotary support member which is arranged at one side of the manipulating knob and supports one end of the rod and a second rotary support member which is arranged at another side of the manipulating knob and supports another end of the rod, and one end of the rod is fixedly mounted on one of the first rotary support member and the second rotary support member while another end of the rod is engaged with another one of the first rotary support member and the second rotary support member.

In the first invention having such a constitution, in mounting the manipulating knob to the support member, since the support member and the rotary support body are provided as separate members, the manipulating knob is mounted on the rotary support body and, thereafter, the rotary support body on which the manipulating knob is mounted can be mounted on the support member. Further, since one end of the rod is fixedly mounted on one of the first rotary support member and the second rotary support member, the manipulating knob and the second rotary support member can be assembled from the same direction with respect to the first rotary support member. Alternatively, the manipulating knob and the first rotary support member can be assembled from the same direction with respect to the second rotary support member. Due to such constitutions, in the present invention, the manipulating knobs can be easily mounted with respect to the support member.

Further, in the above-mentioned invention, the first rotary support member and the second rotary support member may be integrally formed with each other using screws. In the steering switch having such a constitution, the first rotary support member and the second rotary support member can be easily joined using screws.

Further, in the above-mentioned invention, the manipulating knob, the biasing means and the signal changeover means may be integrally put together by way of the rotary support body to form an assembled body. In the steering switch having such a constitution, the biasing means and the signal changeover means can be easily mounted on the support member together with the manipulating knob.

Further, in the above-mentioned invention, the support member may be formed by joining a front-side support which is arranged at a front side of the steering wheel and a back-side support which is arranged at a back side of the steering wheel, and a housing which houses the assembled body therein may be provided to one of the front-side support and the back-side support. In the steering switch having such a constitution, the assembled body can be easily mounted on the support member.

Further, in the above-mentioned invention, a spacer which holds a distance dimension between the first rotary support member and the second rotary support member to a given dimension may be provided between the first rotary support member and the second rotary support member, one end of the spacer may be fixedly mounted on one of the first rotary support member and the second rotary support member, and another end of the spacer may be engaged with another of the first rotary support member and the second rotary support member using a screw. In the steering switch having such a constitution, relative positioning of the first rotary support member and the second rotary support member and fixing of these members using screws can be performed simultaneously.

Further, in the above-mentioned invention, the signal changeover means may include a printed circuit board having a conductive pattern for changing over the two kinds of electric signals and a slide contact which is slidable on the printed circuit board along with rotation of the manipulating knob, the printed circuit board may be arranged parallel to the rotational direction of the manipulating knob and is mounted on one of the first rotary support member and the second rotary support member, and the slide contact may be mounted on the manipulating knob such that the slide contact is slidable on the printed circuit board along with the rotation of the manipulating knob. In the steering switch having such a constitution, it is possible to make the mounting space for the signal changeover means compact.

Further, in the above-mentioned invention, the manipulating knob may include a manipulating knob body which is provided with an L-shaped bend, the rod may be inserted into the bend, and a manipulating portion to which a manipulating force is applied by a manipulator may be provided at one end side of the manipulating knob body using the bend as reference while the biasing means may be provided at another end side of the manipulating knob body. In the steering switch having such a constitution, it is possible to make the mounting space for the manipulating knob and the biasing means compact.

To achieve the above-mentioned first object of the present invention, a steering switch for a vehicle according to the second invention comprises:

a support member which is mounted on a steering wheel, the steering wheel having an annular ring and at least one spoke formed inside the ring;

a manipulating knob which is rotatably supported on the support member such that the manipulating knob is rotatable in front and rear directions of the steering wheel, the manipulating knob projecting inside a space surrounded by the ring and the spoke;

a rotary support body which is mounted on the support member and rotatably supports the manipulating knob;

biasing means which bias the manipulating knob such that the manipulating knob returns to a neutral position; and signal changeover means which are capable of changing over two kinds of electric signals in response to a rotational direction of the manipulating knob from the neutral position, wherein the manipulating knob, the rotary support body, the biasing means and the signal changeover means are integrally put together to form an assembled body, the support member is formed by joining a front-side support which is arranged at a front side of the spoke and a back-side support which is arranged at a back side of the spoke, and a housing which houses the assembled body therein is provided to one of the front-side support and the back-side support.

According to the second invention having such a constitution, in assembling, the assembled body is firstly assembled. Then, the assembled body is housed in the housing provided to one of the front-side support and the back-side support and the front-side support and the back-side support are arranged at the front and back side of the spoke and are connected to each other. That is, the manipulating knob, the rotary support body, the biasing means and the signal changeover means can be assembled independently from the support member and hence, the manipulating knob, the biasing means and the signal changeover means can be easily assembled to the support member.

Further, in the above-mentioned invention, on an inner all of the housing, a positioning portion which is engaged with a given portion of the assembled body housed in the housing so as to position the assembled body with respect to the housing may be mounted. In the steering switch having such a constitution, it is possible to arrange the assembled body on the support member with accuracy.

Further, in the above-mentioned invention, a guide which is brought into slide contact with a given portion of the assembled body so as to guide movement of the assembled body when the assembled body is housed in the housing may be mounted on the inner wall of the housing. In the steering switch having such a constitution, the assembled body can be smoothly housed in the support member.

Further, in the above-mentioned invention, the housing may be formed on the back-side support. In the steering switch having such a constitution, a rate of mounting space for the steering switch for a vehicle which occupies in a front-side space of the steering wheel can be reduced.

Further, in the above-mentioned invention, the housing may have an insertion opening for inserting the assembled body into the housing at a position which faces the front-side support. In the steering switch having such a constitution, assembling of the assembled body to the back-side support and the assembling of the front-side support to the back-side support can be performed from the same direction.

To achieve the above-mentioned second object, a steering switch for a vehicle according to the third invention comprises:

a support member which is mounted on a steering wheel, the steering wheel having an annular ring and at least one spoke formed inside the ring;

a manipulating knob which is rotatably supported on the support member such that the manipulating knob is rotatable in front and rear directions of the steering wheel, the manipulating knob projecting inside a space surrounded by the ring and the spoke;

a rotary support body which is mounted on the support member and rotatably supports the manipulating knob;

biasing means which bias the manipulating knob such that the manipulating knob returns to a neutral position; and signal changeover means which are capable of changing over two kinds of electric signals in response to a rotational direction of the manipulating knob from the neutral position, wherein the manipulating knob includes a manipulating knob body which is formed of a member having an L-shaped bend, and a manipulating portion to which a manipulating force is applied by a manipulator is provided at one end side of the manipulating knob body using the bend as reference while the biasing means are provided at another end side of the manipulating knob body, the rotary support body includes a first side plate which is positioned at one side of the manipulating knob body and a second side plate which is positioned at another side of the manipulating knob body, and the manipulating knob body is rotatably supported between the first side plate and the second side plate, and the signal changeover means include a printed circuit board having a conductive pattern for changing over the two kinds of electric signals and a slide contact which is slidable on the printed circuit board along with rotation of the manipulating knob, the printed circuit board is arranged parallel to the rotational direction of the manipulating knob and is mounted on one of the first side plate and the second rotary side plate, and the slide contact is mounted on the manipulating knob body such that the slide contact is slidable on the printed circuit board along with the rotation of the manipulating knob body.

In the third invention having such a constitution, the bend is formed on the manipulating knob body, the manipulating portion to which the manipulating force is imparted by the manipulator is provided to one end side of the manipulating knob body and the biasing means is provided to another side of the manipulating knob body using the bend as the reference. Further, the printed circuit board of the signal changeover means is arranged parallel to the rotational direction of the manipulating knob body and, at the same time, is mounted on the side plate which is positioned at the side of the manipulating knob body and hence, the manipulating knob, the biasing means and the signal change over means can be assembled in a compact form. Accordingly, the steering switch for a vehicle can be miniaturized.

In the above-mentioned invention, the manipulating knob, the rotary support body, the biasing means and the signal changeover means may be integrally put together to form an assembled body, the support member may be formed by joining a front-side support which is arranged at a front side of the spoke and a back-side supports which is arranged at a back side of the spoke, and a housing which houses the assembled body therein may be provided to one of the front-side support and the back-side support.

In the above-mentioned invention having such a constitution, the manipulating knob, the rotary support body, the biasing means and the signal changeover means can be assembled independently from the support member and hence, the manipulating knob, the biasing means and the signal changeover means can be easily mounted on the support member.

In the above-mentioned invention, the biasing means may include a resilient member which is housed in another end side of the manipulating knob body and generates a biasing force for biasing the manipulating knob to the neutral position, a cam ember which faces another end of the manipulating knob body in an opposed manner and has a cam face which guides the manipulating knob to the neutral position, and a drive member which is slidably inserted into another side of the manipulating knob body, has one end thereof pushed by the resilient member and another end thereof brought into contact with the cam face, and the cam ember may be detachably mounted on the rotary support body.

In the above-mentioned invention having such a constitution, in changing setting of a feeling of manipulation which is imparted to a manipulator at the time of rotation of the manipulating knob, it is possible to replace the existing cam member with another cam member having a cam face shape different from the cam face shape of the existing cam member.

In the above-mentioned invention, a fulcrum of rotation of the manipulating knob may be provided by supporting both ends of a rod which is inserted into the bend of the manipulating knob using the first side plate and the second side plate of the rotary support body, the rotary support body may be constituted by joining a first rotary support member which has the first side plate and supports one end of the rod using the first side plate and a second rotary support member which has the second side plate and supports another end of the rod using the second side plate, the cam member of the biasing means may be detachably mounted on one of the first rotary support member and the second rotary support member, one end of the rod may be engaged with the side plate of one of the rotary support members to which the cam member is mounted and another end of the rod is fixedly mounted on the side plate of the other rotary support member, the printed circuit board of the signal changeover means may be mounted on the side late of the one rotary support member, and a spacer which holds distance dimension between the first side plate and the second side plate to a given dimension may be provided between the first side plate and the second side plate, one end of the spacer may be fixedly mounted on the side plate of the one rotary support member and another end of the spacer may be engaged with the side plate of the other rotary support member using a screw.

In the above-mentioned invention having such a constitution, it is possible to assemble the printed circuit board, the manipulating knob body and the second rotary support member to the first rotary support member from the same direction.

To achieve the above-mentioned third object, a steering switch for a vehicle according to the fourth invention comprises:

a casing which is mounted on a steering wheel having an annular ring and at least one spoke disposed inside the ring and is formed by joining a front-side casing member which is arranged at a front side of the spoke and a back-side casing member which is arranged at a back side of the spoke;

a first switch which is housed in one of the front-side casing member and the back-side casing member and a second switch which is housed in another casing member;

a first terminal which is mounted on the first switch and transmits an electric signal outputted from the first switch to outside, a second terminal which is mounted on the other casing ember and receives the electric signal transmitted from the first terminal;

a first external output terminal which is mounted on another casing member and transmits the electric signal inputted to the second terminal to given equipment; and a second external output terminal which is mounted on the other casing member and transmits an electric signal outputted from the second terminal to other equipment than the given equipment; wherein the first terminal and the second terminal are respectively arranged at the one casing member and the other casing member such that the first terminal and the second terminal are brought into contact with each other when the one casing member and the other casing member are joined to each other.

In the fourth invention having such a constitution, since the first, the second external output terminals and the second switch are mounted in another casing member, it is possible to collectively perform the wiring work in another casing member and, at the same time, the first terminal and the second terminal can be connected to each other by joining the front-side casing member and the back-side casing member and hence, the connection of the first switch with respect to the wiring provided to another casing member can be easily performed whereby the wiring work can be performed easily.

Further, in the present invention, a group of external output terminals may be formed by collecting the first external output terminal and the second external output terminal at one place. In the above-mentioned invention having such a constitution, the wiring operation between the first switch and given equipment and the wiring operation between the second switch and other given equipment can be performed efficiently.

In the present invention, at least one of the first terminal and the second terminal may have resiliency. In the present invention having such a constitution, the stable contact state between the first terminal and the second terminal can be ensured.

Further, in the present invention, the first switch may be formed by integrally putting together a manipulating knob which is rotatably supported on the casing such that the first switch is rotatable in front and rear directions of the steering wheel, the manipulating knob projecting inside a space surrounded by the ring and the spoke, a rotary support body which is mounted on the casing and rotatably supports the manipulating knob, biasing means which bias the manipulating knob such that the manipulating knob returns to a neutral position, and signal changeover means which are capable of changing over two kinds of electric signals in response to a rotational direction of the manipulating knob from the neutral position, the second switch may be a push switch which includes a manipulating button exposed to a front side of the front-side casing member, and the first switch may be housed in the back-side casing member while the second switch may be housed in the front-side casing member.

In the above-mentioned-invention having such a constitution, the first switch which requires a large housing space is housed in the back-side casing member and the second switch which requires a small housing space compared to the housing space for the first switch is housed in the front-side casing member, a rate of mounting space in the front-side space of the steering wheel can be reduced.

To achieve the above-mentioned fourth object of the present invention, a steering switch for a vehicle of the fifth invention comprises:

a casing which is mounted on a steering wheel having an annular ring and at least one spoke disposed inside the ring and is formed by joining a front-side casing member which is arranged at a front side of the spoke and a back-side casing member which is arranged at a back side of the spoke; and a switch which is housed in the casing, wherein the casing includes snap joining portions which are formed on opposing side faces respectively so as to join the front-side casing member and the back-side casing member, the snap joining portion includes a pair of snap pawls having resiliency and engaging portions which are engaged with the snap pawls, and a shape of the snap pawls and a shape of the engaging portions are set such that when an external force of not less than a given magnitude in a direction which makes the front-side casing member and the back-side casing member spaced apart from each other is applied to the casing, an outer force which deflects the snap pawls in a direction away from the engaging portions acts on the snap pawls.

In the fifth invention having such a constitution, at the time of disassembling, for example, an operator grasps the front-side casing member and the back-side casing member respectively with his fingers and imparts an external force which is equal to or more than a given force in the direction to make the front-side casing member and the back-side casing member move away from each other whereby the joined state of the front-side casing member and the back-side casing member due to the snap joining portion can be released. Accordingly, the joined state of the front-side casing member and the back-side casing member can be easily disassembled. Accordingly, the disassembling operation can be performed easily.

In the above-mentioned invention, the snap pawl may have a projection on which oblique surfaces are formed such that a thickness of the snap pawl is gradually decreased from a distal end to a proximal end of the snap pawl, and the engaging portion may be formed of a hole having an opening and a depth sufficient to allow the whole projection to be fitted therein.

Further, in the above-mentioned invention, the casing may include, in addition to the snap joining portion, another snap joining portion for joining the front-side case member and the back-side casing member, and a joining releasing portion for releasing a joined state of the other snap joining portion by inserting a specific tool.

In the present invention having such a constitution, when the casing is not disassembled, the front-side casing and the back-side casing can be firmly joined to each other.

Further, in the above-mentioned invention, in the vertical direction of the steering wheel, the snap engaging portions may be arranged at an upper portion of the casing, and another snap engaging portion and the engagement releasing portions may be arranged at the center of the lower portion of the casing.

In the present invention having such a constitution, the joined state between the front-side casing member and the back-side casing member by another snap joining portion at the lower portion of the casing is released and, thereafter, the front-side casing member and the back-side casing member are rotated in the direction to make the lower portion of the front-side casing member and the lower portion of the back-side casing member away from each other using the contact between the front-side casing member and the back-side casing member as a fulcrum, whereby the joined state between the front-side casing member and the back-side casing member by the snap joining portion at the upper portion of the casing can be easily released.

In the above-mentioned invention, the switch may be formed by integrally putting together a manipulating knob which projects inside a space surrounded by the ring and the spoke, a rotary support body which is mounted on the support member and rotatably supports the manipulating knob, biasing means which bias the manipulating knob such that the manipulating knob returns to a neutral position, and signal changeover means which are capable of changing over two kinds of electric signals in response to a rotational direction of the manipulating knob from the neutral position, and a housing which houses the switch may be formed on one of the front-side casing member and the back-side casing member.

In a constitution like this, a switch that can change over two kinds of electric signals can be easily mounted to a casing.

DESCRIPTION OF THE PREFERRED EMBODIMENTS

Hereinafter, a steering switch for a vehicle of embodiments of the present invention is explained hereinafter.

Figure 1:
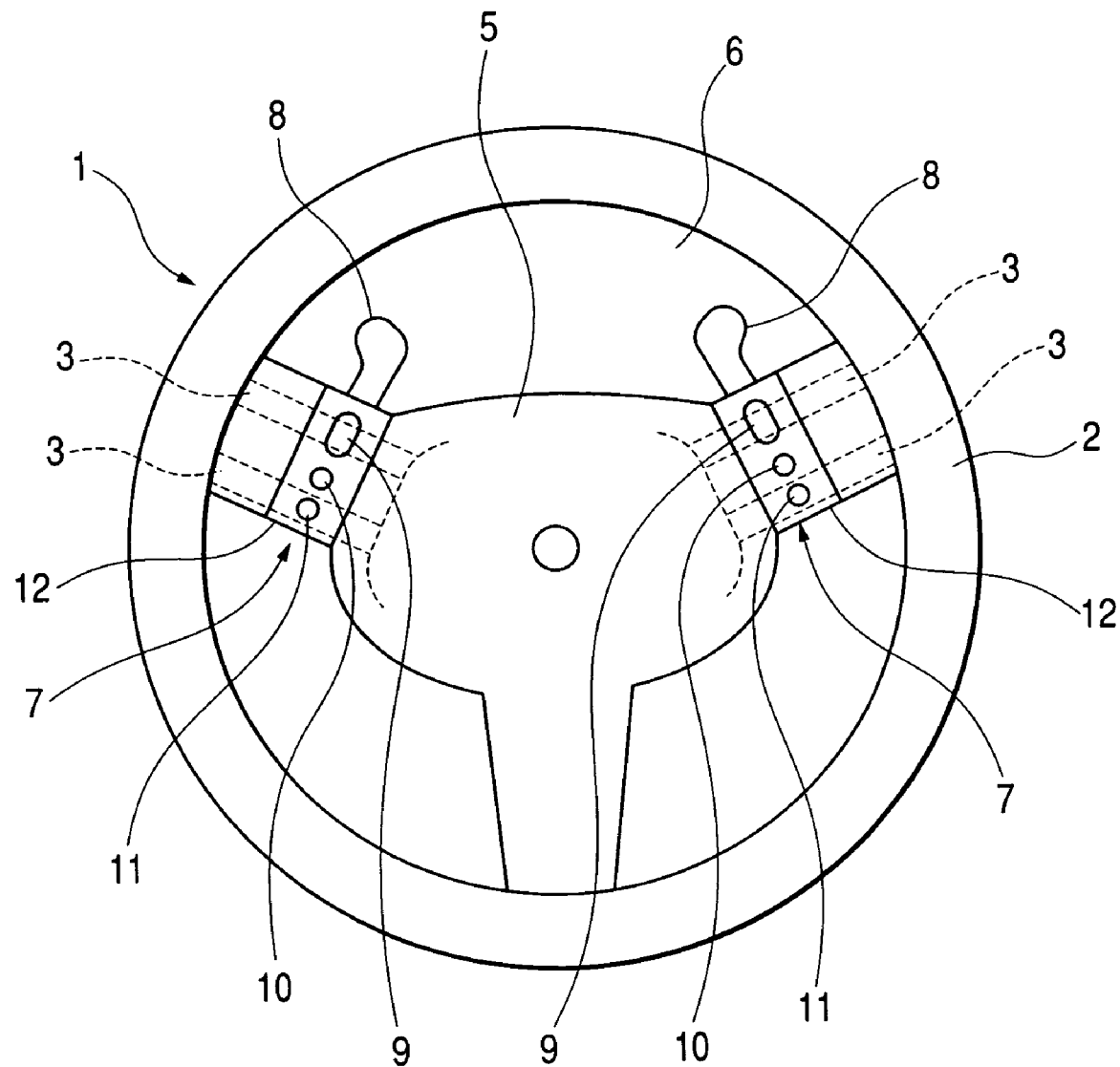
FIG. 1 is a front view showing a state in which an embodiment of a steering switch for a vehicle according to the first to the fifth inventions of the present invention is mounted on a steering wheel.
Figure 2:
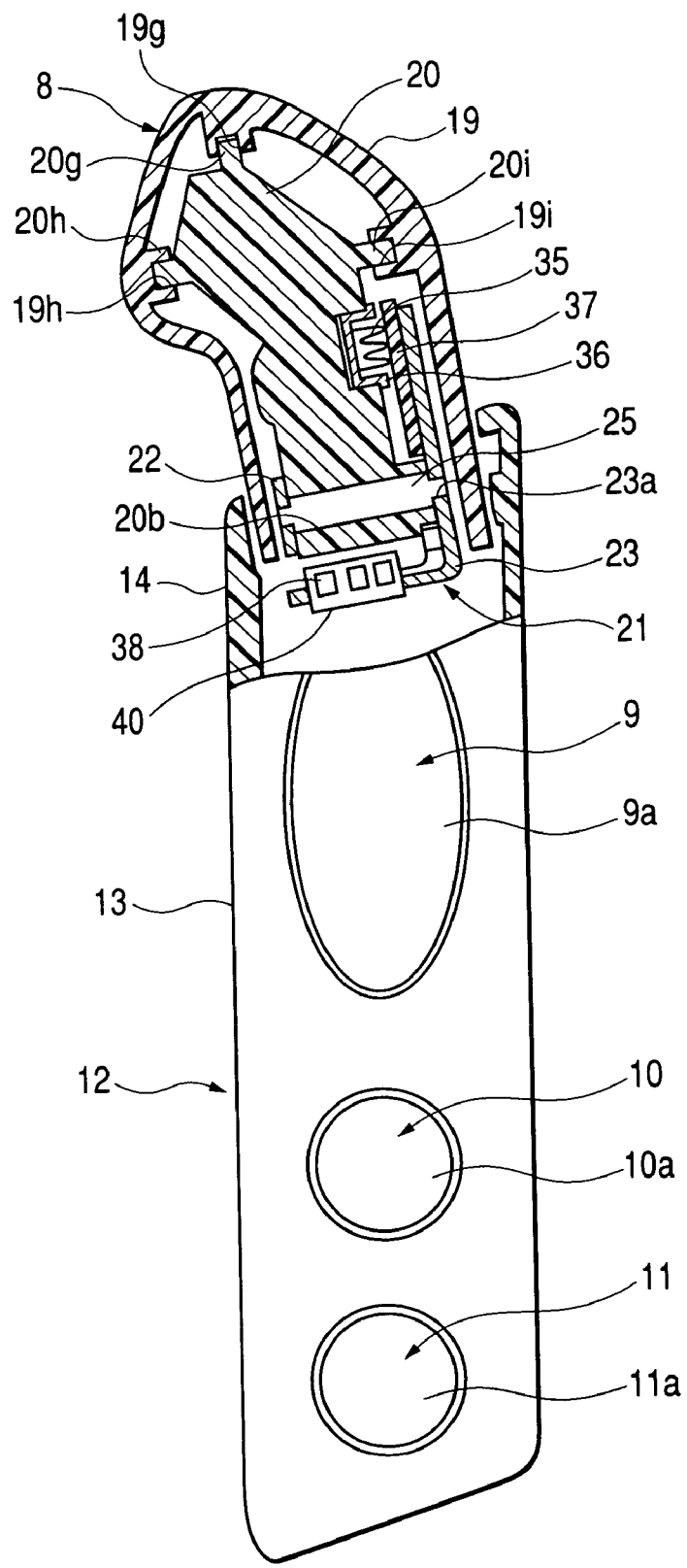
FIG. 2 is a front view of the embodiment of the steering switch for a vehicle according to the first and the third inventions of the present invention.
Figure 3:
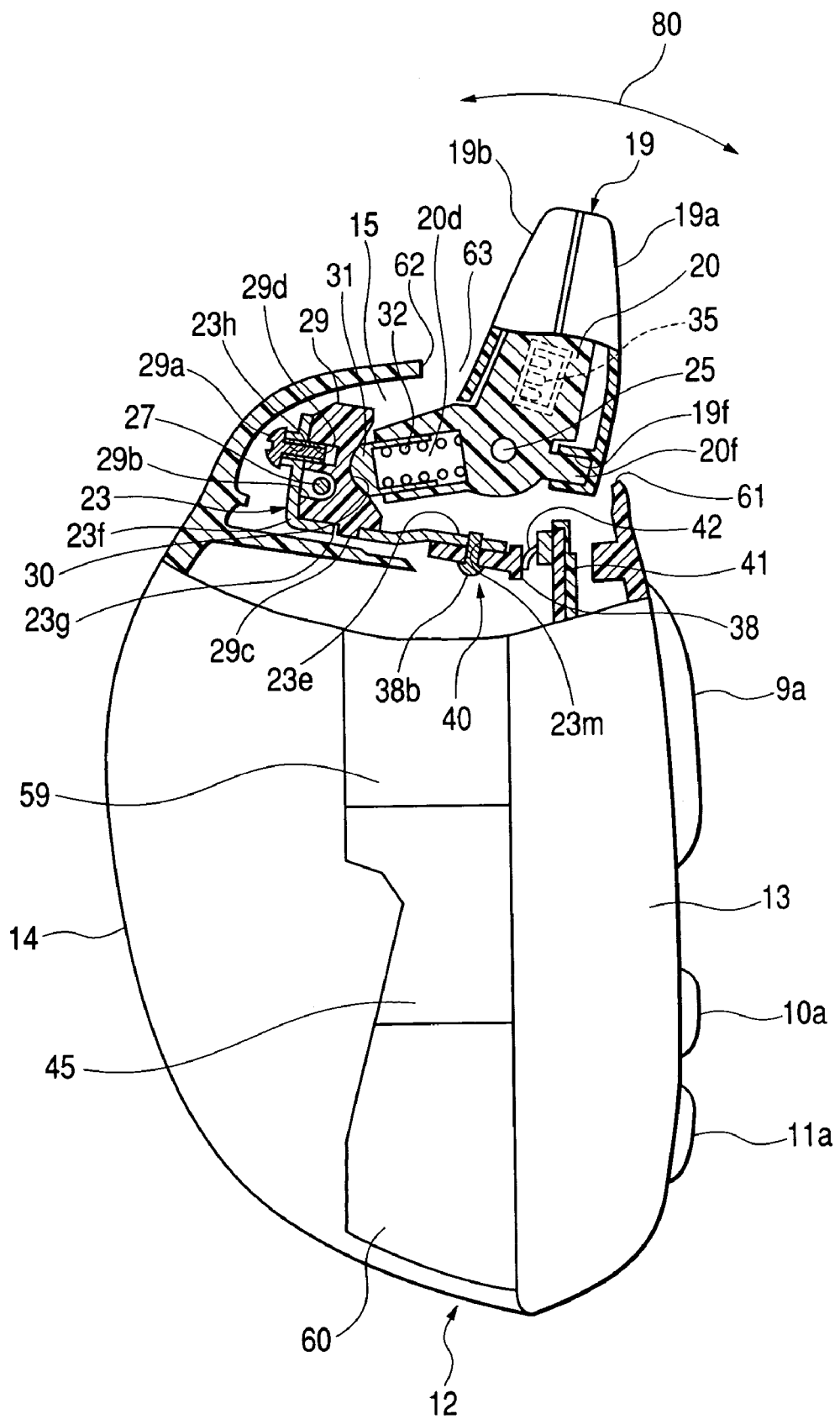
FIG. 3 is a left side view of the embodiment of the steering switch for a vehicle according to the second and the fourth inventions of the present invention.
Figure 4:
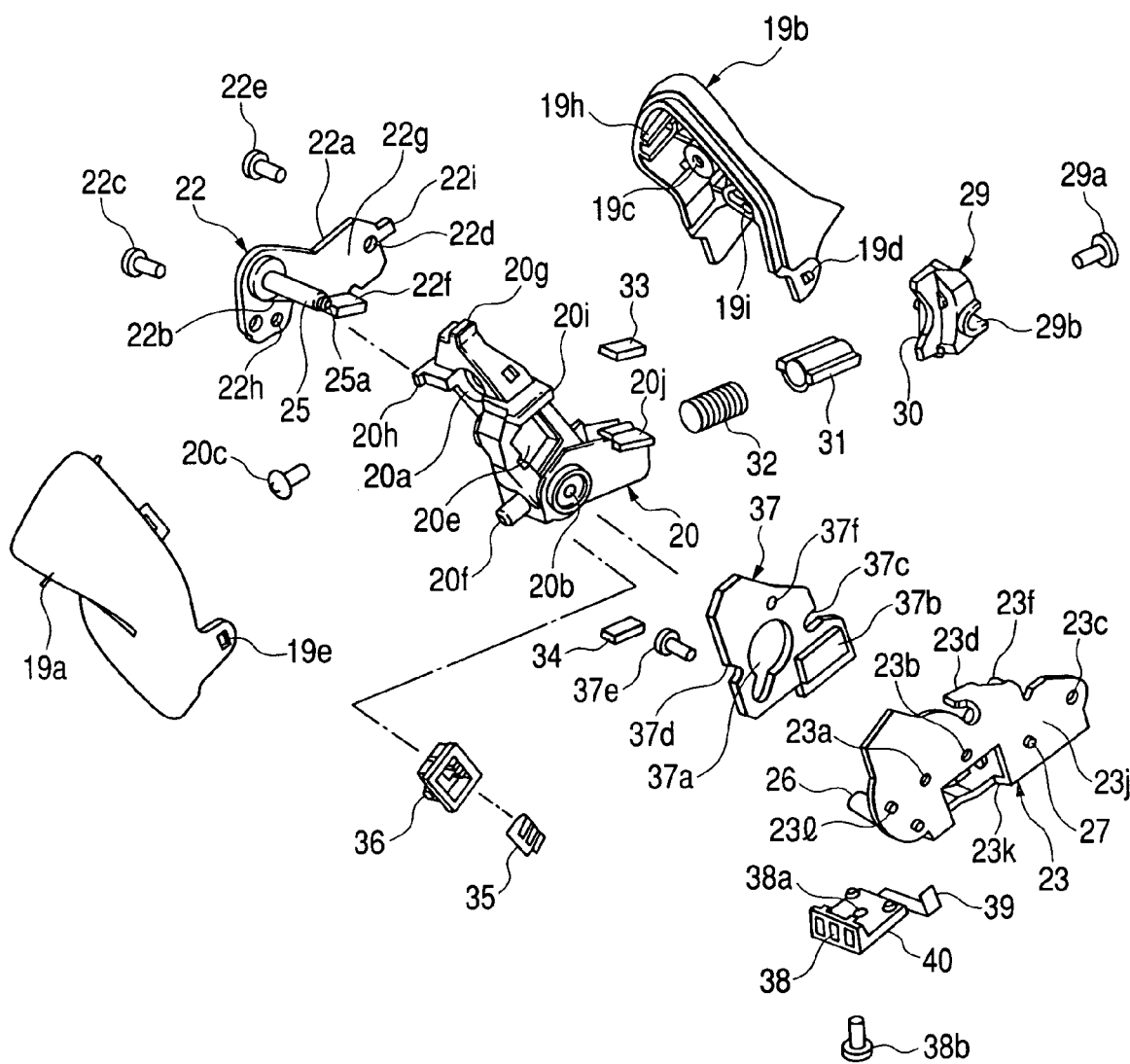
FIG. 4 is an exploded perspective view of a rotary switch provided to the embodiment of the steering switch for a vehicle according to the first and the third inventions of the present invention.
Figure 5:
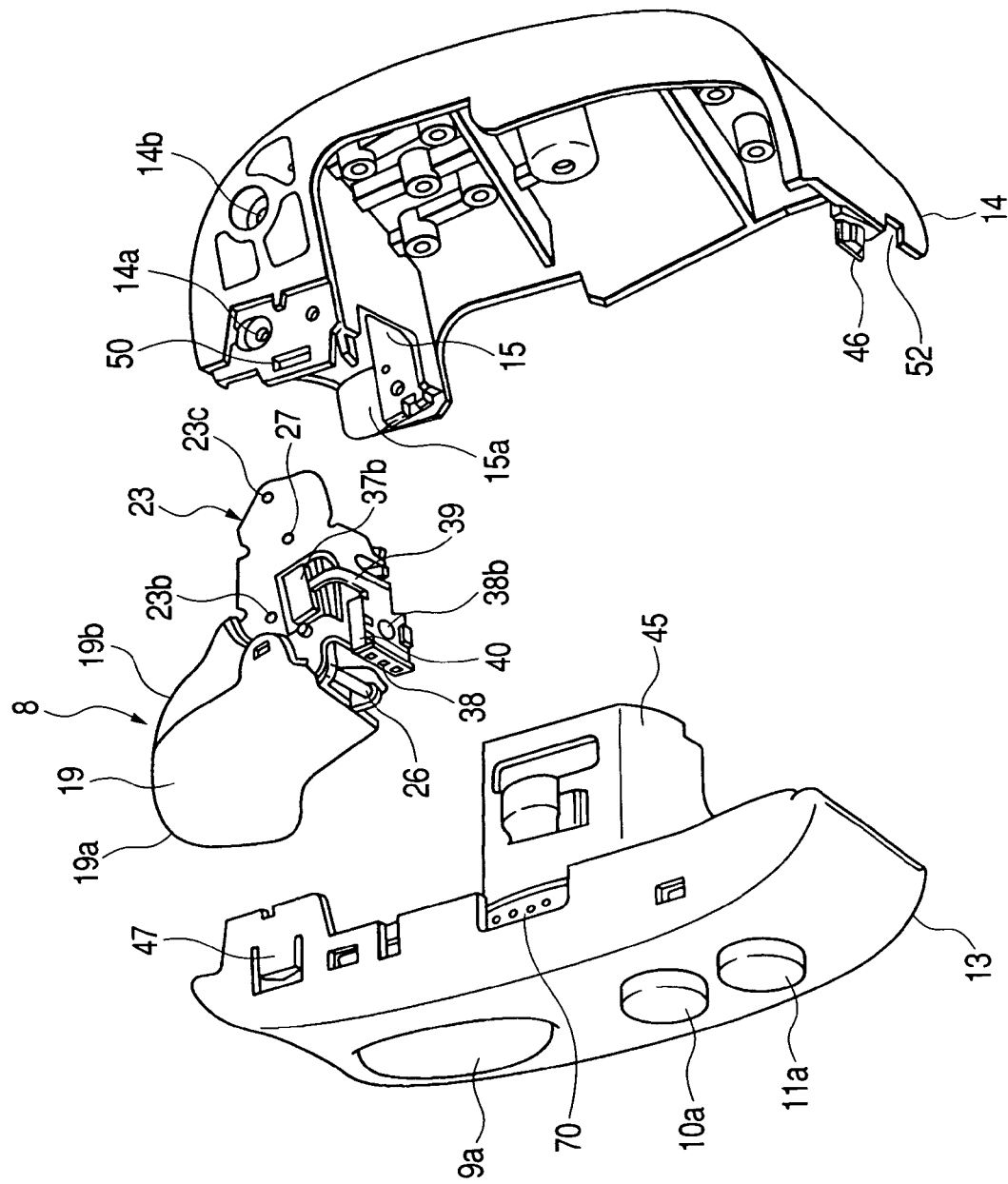
FIG. 5 is an exploded perspective view showing the positional relationship of a front-side casing member and a back-side casing member provided to the embodiment of the steering device according to the fourth invention of the present invention.
Figure 6:
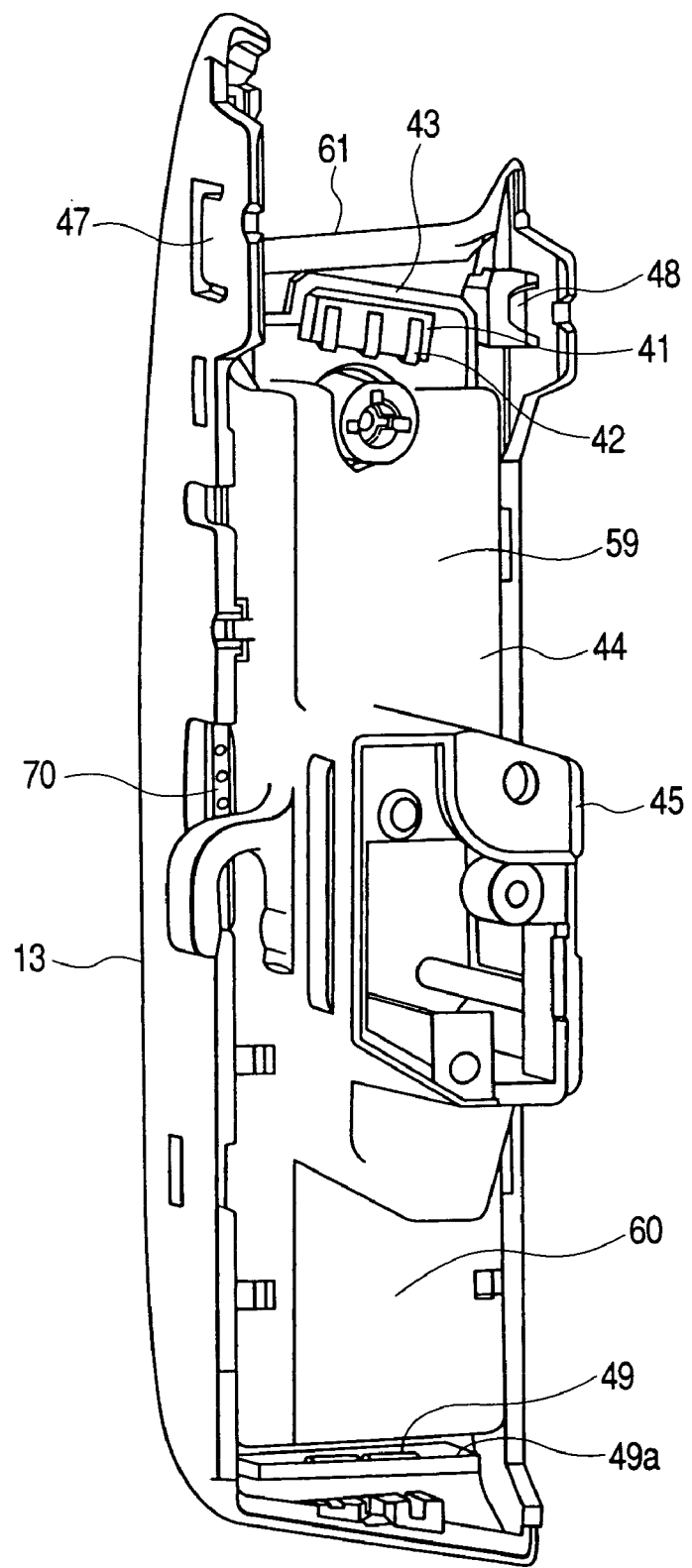
FIG. 6 is a perspective view showing a back-side of the front-side casing member provided to the embodiment of the steering device according to the fourth invention of the present invention.
Figure 7:
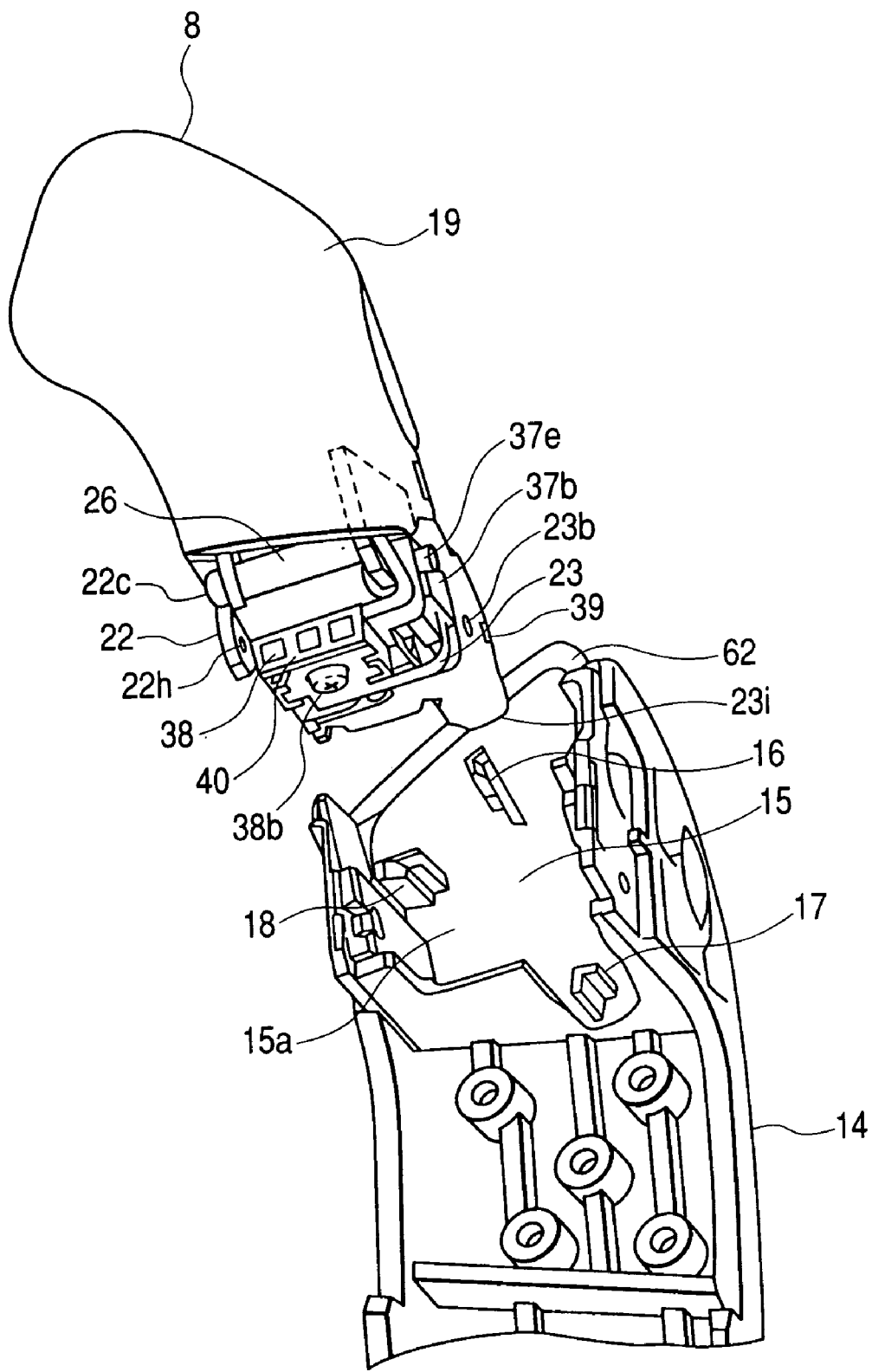
FIG. 7 is an enlarged perspective view showing an accommodating portion mounted on a back-side casing member provided to the embodiment of the steering device according to the second invention of the present invention.
Figure 8:
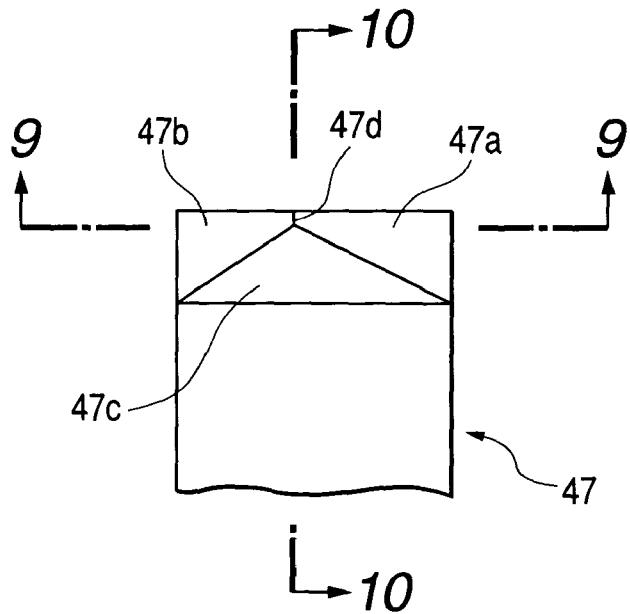
FIG. 8 is an enlarged front view of a second snap pawl provided to the embodiment of the steering device according to the fifth invention of the present invention.
Figure 9:
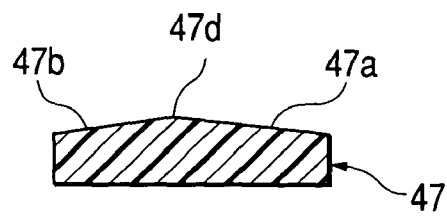
FIG. 9 is a cross-sectional view taken along a line 9-9 in FIG. 8.
Figure 10:
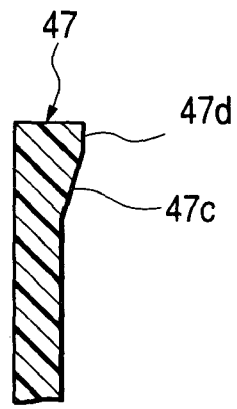
FIG. 10 is a cross-sectional view taken along a line 10-10 in FIG. 8.
Figure 11:
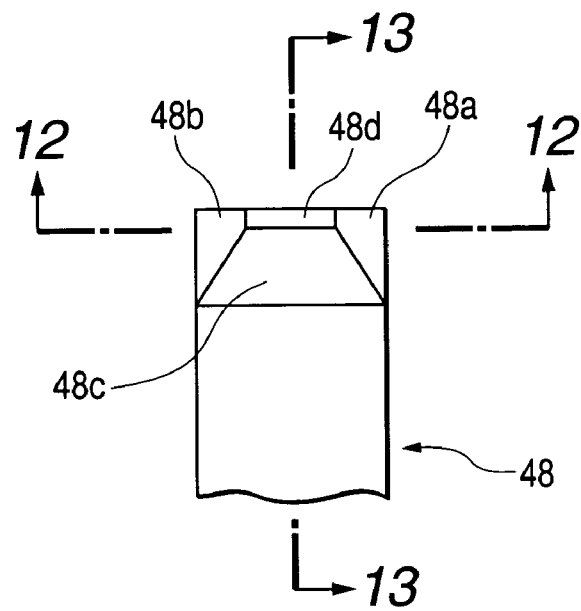
FIG. 11 is an enlarged front view of a third snap pawl provided to the embodiment of the steering device according to the fifth invention of the present invention.
Figure 12:
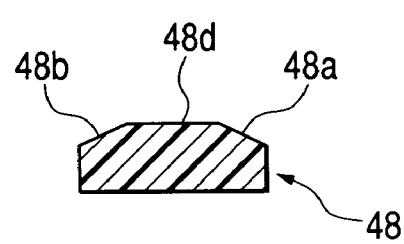
FIG. 12 is a cross-sectional view taken along a line 12-12 in FIG. 11.
Figure 13:
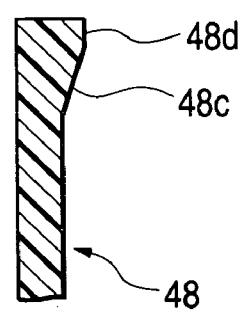
FIG. 13 is cross-sectional view taken along a line 13-13 in FIG. 12.

In the drawings, FIG. 1 is a front view showing a state in which an embodiment of a steering switch for a vehicle according to the first to the fifth inventions of the present invention is mounted on a steering wheel, FIG. 2 is a front view of the embodiment including a cross-section of the steering switch for a vehicle according to the first and the third inventions of the present invention, FIG. 3 is a left-side view of the embodiment including a cross-section of the steering switch for a vehicle according to the second and the fourth inventions of the present invention, FIG. 4 is an exploded perspective view of a rotary switch provided to the embodiment of the steering switch for a vehicle according to the first and the third inventions of the present invention, FIG. 5 is an exploded perspective view showing the positional relationship of a front-side casing member and a back-side casing member provided to the embodiment of the steering device according to the fourth invention of the present invention, FIG. 6 is a perspective view showing a back-side of the front-side casing member provided to the embodiment of the steering device according to the fourth invention of the present invention, FIG. 7 is an enlarged perspective view showing an accommodating portion mounted on a back-side casing member provided to the embodiment of the steering device according to the second invention of the present invention, FIG. 8 is an enlarged front view of a second snap pawl provided to the embodiment of the steering device according to the fifth invention of the present invention, FIG. 9 is a cross-sectional view taken along a line 9-9 in FIG. 8, FIG. 10 is a cross-sectional view taken along a line 10-10 in FIG. 8, FIG. 11 is an enlarged front view of a third snap pawl provided to the embodiment of the steering device of the present invention, FIG. 12 is a cross-sectional view taken along a line 12-12 in FIG. 11, and FIG. 13 is cross-sectional view taken along a line 13-13 in FIG. 12.

The embodiments according to the first to fifth inventions are directed to steering switches 7 for vehicle which are mounted on a steering wheel 1 shown in FIG. 1. The steering wheel 1 includes an annular ring 2, a plurality of spokes 3 which are formed inside the ring 2, and a pad 5 which covers the spokes 3. The steering switches 7 for vehicle are mounted on the both left-and-right-side spokes 3 such that the steering switches 7 for vehicle are embedded into the pad 5. Here, both left-and-right-side steering switches 7 for a vehicle are formed in a left-and-right symmetry and hence, they have substantially the same constitution. Accordingly, the explanation is made hereinafter by taking the left-side steering switch 7 for a vehicle as an example.

The steering switch 7 for a vehicle includes, as shown in FIG. 1 to FIG. 3, a support member which is mounted on the spoke 3. That is, the steering switch 7 for a vehicle includes a casing 12 which is mounted on the spoke 3 in a state that a rotary switch 8 and push switches 9 to 10 are accommodated in the casing 12. The rotary switch 8 is provided for changing over two kinds of electric signals, for example, a first ON signal and a second ON signal by rotating a manipulating knob 19 in front and back directions of the steering wheel 1 (the direction of an arrow 80 shown in FIG. 3). The push switches 9 to 11 perform turn ON/OFF operations in response to pushing manipulations of manipulating buttons 9a to 11a. A manipulating knob 19 of the rotary switch 8 is, as shown in FIG. 3, projected from an opening 63 formed in the casing 12. Further, the manipulating knob 19 is arranged inside a space 6 surrounded by the ring 2 and the spokes 3 as shown in FIG. 1. Further, manipulating buttons 9a to 11a of the push switches 9 to 11 are projected from the front side of the casing 12.

Here, the rotary switch 8 is manipulated in the midst of traveling in a drive range, for example. The rotary switch 8 is provided for manually shifting up an automatic transmission by rotating the manipulating knob 19 which is in a neutral position from the front side to the back-side of the steering wheel 1 and for manually shifting down the automatic transmission by rotating the manipulating knob 19 which is in the neutral position from the back-side to the front side of the steering wheel 1. Further, the push switches 9 to 11 are switches for operating horns or blinkers, for example.

Here, the constitution of the rotary switch 8 is explained in detail in conjunction with FIG. 2 to FIG. 4.

The rotary switch 8 is obtained by integrally forming the manipulating knob 19 and a rotary support body 21 (shown in FIG. 2) which rotatably supports the manipulating knob 19 with respect to the casing 12, biasing means which biases and restores the manipulating knob 19 to the neutral position, and signal changeover means which changes over two kinds of ON signals in response to the rotational direction of the manipulating knob 19 from the neutral position.

The manipulating knob 19 includes a manipulating knob body 20 having an L-shaped bend. A hole 20b is formed in the bend of the manipulating knob body 20 and a rod 25 is configured to be inserted through the hole 20b. At one end side of this manipulating knob body 20 using the bend as a reference, the first knob cover 19a and the second knob cover 19b are mounted so that the operation portion to which an operation power is given by the fingers of the operator is formed.

As shown in FIG. 4, the first knob cover 19a and the second knob cover 19b are snap-connected by a rectangular hole 19e formed in the first knob cover 19a and a pawl 19d mounted on the second knob cover 19b in a state that they sandwich the manipulating knob body 20. Further, a projection 20f which is projected in the direction opposite to another end side is formed on the bend of the manipulating knob body 20, while a recess 19f (shown in FIG. 3) which is fitted into the projection 20f is formed in the first knob cover 19a. Further, projections 20g to 20i are formed on three portions made up of an upper portion of one end side and both side portions of the manipulating knob body 20, while recesses 19g to 19h into which the respective projections 20g to 20i are fitted are formed in the second knob cover 19b. Further, as shown in FIG. 4, a hole 20a through which a screw 20c is inserted is formed in one end side of the manipulating knob body 20 and a screw hole 19c into which a screw 20c is threaded is formed in a portion of the second knob cover 19b corresponding to the hole 20a.

Further, as shown in FIG. 3, a spring 32 and a driving rod 31 which constitute the biasing means are inserted into another end side of the manipulating knob body 20 using the bend as the reference. That is, a slide hole 20d in which the driving rod 31 is slidably disposed is formed in another end side of the manipulating knob body 20. The spring 32 and the driving rod 31 are in the slide hole 20d such that the driving rod 31 is brought into pressure contact with a cam face 30 of a cam member 29.

As shown in FIG. 4, the rotary support body 21 includes a first rotary support member 23 which is arranged at one side of the manipulating knob body 20 and a second rotary support member 22 which is arranged at another side of the manipulating knob body 20.

The first rotary support member 23 has a side plate 23*j* which is arranged to face one side of the manipulating knob body 20, while the second rotary support member 22 has a side plate 22*g* which is arranged to face another side portion of the manipulating knob body 20. A rod 25 which is inserted into the bend of the manipulating knob body 20 is arranged between the side plate 23*j* of the first rotary support member 23 and the side plate 22*g* of the second rotary support member 22. Further, a projection 25*a* is formed on one end of the rod 25, while a hole 23*a* into which the projection 25*a* of the rod 25 is inserted is formed in the side plate 23*j* of the first rotary support member 23. Further, another end of the rod 25 is fixed to the side plate 22*g* of the second rotary support member 22. That is, the manipulating knob body 20 is rotatable because that both ends of the rod 25 are supported by the first and the second rotary support members 23, 22 in a state that the rod 25 is inserted into the hole 20*b* of the bend of the manipulating knob body 20.

Further, between the first rotary support member 23 and the second rotary support member 22, a first spacer 26 and a second spacer 27 which hold a gap between the side plate 23*j* of the first rotary support member 23 and the side plate 22*g* of the second rotary support member 22 in a given size are mounted.

One end of the first spacer 26 and one end of the second spacer 27 are respectively fixed to the side plate 23*j* of the first rotary support member 23. Further, screw holes which are not shown in the drawing are formed in another end of the first spacer 26 and another end of the second spacer 27. Another end of the first spacer 26 is arranged on the side plate 22*g* of the second rotary support member 22 and a hole 22*b* through which a screw 22*c* is inserted is formed in the side plate 22*g*. Also another end of the second spacer 27 is arranged on the side plate 22*g* of the second rotary support member 22 and a hole 22*d* through which a screw 22*e* is inserted is formed in the side plate 22*g*. That is, another end of the first spacer 26 and another end of the second spacer 27 are fixed to the side plate 22*g* of the second rotary support member 22 with the screws 22*c*, 22*e* and hence, the first rotary support member 23 and the second rotary support member 22 are integrally formed.

Further, the second rotary support member 22 has a projection 22*i* at a periphery thereof which is arranged at another end side of the manipulating knob body 20 and the first rotary support member 23 has a recess not shown in the drawing into which the projection 22*i* is fitted. That is, by means of these projection 22*i* and recess, the relative position between the side plate 23*j* of the first rotary support member 23 and the side plate 22*g* of the second rotary support member 22 is determined.

Further, on the upper portion of the side plate 23*j* of the first rotary support member 23, a first restriction portion 23*d* which is arranged above another end side of the manipulating knob body 20 and restricts the rotation of another end side of the manipulating knob body 20 in the upward direction exceeding a given angle is formed. In the same manner, on the lower portion of the side plate 22*g* of the second rotary support member 22, a second restriction portion 22*f* which is arranged under another end side of the manipulating knob body 20 and restricts the rotation of another end side of the manipulating knob body 20 in the downward direction exceeding a given angle is formed. Further, in the manipulating knob body 20, rubber mats 33, 34 which constitute shock-absorbing members are adhered to the portions where the manipulating knob body is brought into contact with the first restricting portion 23*d* and the second restricting portion 22*f* respectively. For example, the rubber mat 33 is attached to a stepped portion 20*j* formed on the upper portion of another end side of the manipulating knob body 20 and the rubber mat 34 is attached on the stepped portion not shown in the drawing and formed on the lower portion of another end side of the manipulating knob body 20.

As shown in FIG. 3, the biasing means includes the slide hole 20*d* which is formed in another end side of the manipulating knob body 20, the driving rod 31 which is inserted into the slide hole 20*d* in a slidable manner, the spring 32 which is arranged in the slide hole 20*d* and always compresses one end of the driving rod 31, and the cam member 29 which is mounted on the rotary support body 21 and has a cam face 30 thereof in slide contact with another end of the driving rod 31. Here, the cam face 30 is made up of a V-shaped surface having a valley and a crest, wherein a portion which corresponds to the neutral position of the manipulating knob 19 constitutes a valley.

The cam member 29 includes a projection 29*c* which is formed on a lower portion thereof, a screw hole 29*d* which is formed in a back-side portion of the cam face 30 and into which a screw 29*a* is threaded, and a groove 29*b* which is formed below the screw hole 29*d* and in which the second spacer 27 is arranged. Further, a cam member mounting portion 23*f* on which the cam member 29 is mounted is formed on the first rotary support member 23. The cam member mounting portion 23*f* is formed in an L shape in cross section such that the back-side portion and a lower portion of the cam member 29 is brought into contact with the cam member mounting portion 23*f*. The cam member mounting portion 23*f* further includes a hole 23*g* into which a projection 29*c* formed on the lower portion of the cam member 29 is fitted and a hole 23*h* which is formed at a position corresponding to the screw hole 29*d* of the cam member 29 and into which a screw 29*a* is inserted. That is, the cam member 29 is mounted on the first rotary support ember 23 in a detachable manner by means of the screw 29*a*.

As shown in FIG. 4, the signal changeover means includes a first printed circuit board 37 which faces one side of the manipulating knob body 20, is arranged in parallel to the rotating direction of the manipulating knob body 20 and is mounted on a side plate 23*j* of the first rotary support member 23, a slide contact 35 which is mounted on one side of the manipulating knob body 20 such that the slide contact 35 slides on the first printed circuit board 37, and a first terminal 38 which is connected to the first printed circuit board 37 by a flexible cable 39 for leading electric signals outputted from the rotary switch 8 to the outside.

A conductive pattern made up of a resistance pattern and a collector pattern which are not shown in the drawing is provided to the first printed circuit board 37 and two types of electric signals, that is, a first ON signal and a second ON signal are changed over in response to the slide movement of the slide contact 35 on the conductive pattern.

A hole 37*f* is formed in the upper portion of the first printed circuit board 37 and a projection not shown in the drawing which is fitted into the hole 37*f* is formed on the side plate 23*j* of the first rotary support member 23. Further, a notch 37*d* into which a screw 37*e* is inserted is formed in a periphery of the first printed circuit board 37, while in a side plate 23*j* of the first rotary support member 23, a screw hole 23*l* into which the screw 37*e* which passes through the notch 37*d* is threaded is formed. That is, the first printed circuit board 37 is fixed to the side plate 23*j* of the first rotary support member 23 by means of the screw 37*e*. Further, at the center of the first printed circuit board 37, a hole 37*a* into which the rod 25 and the first spacer 26 are inserted is formed.

The slide contact 35 is mounted on one side of the manipulating knob body 20 by means of a slide contact mounting member 36. A rectangular connecting hole 20e into which the slide contact mounting member 36 is connected is formed in one side of the manipulating knob body 20.

As shown in FIGS. 3, 4, the first terminal 38 is mounted on the lower portion of the first rotary support member 23. This first terminal 38 is mounted on the first terminal mounting member 40 and a hole 38a into which a screw 38b is inserted is formed in the first terminal mounting member 40. Further, a terminal mounting portion 23e having a screw hole 23m into which the screw 38b is threaded is formed in the lower portion of the first rotary support member 23. That is, the first terminal mounting member 40 formed on the first terminal 38 is fixed to the terminal mounting portion 23e with the screw.

Further, the first terminal 38 is brought into contact with the second terminal 42 which is mounted on the front-side casing member 13 when the front-side casing member 13 and the back-side casing member 14 are connected to each other. The constitution of the second terminal 42 will be described later.

Still further, a connecting portion 37b to which the first terminal 38 is connected is formed on the first printed circuit board 37 and, in the side plate 23j of the first rotary support member 23, a hole 23k which exposes the connecting portion 37b outside of the side plate 23j when the first printed circuit board 37 is mounted on the side plate 23j is formed. The first terminal 38 is connected with the connecting portion 37b which is formed on the first printed circuit board 37 by a flexible cable 39 from the outside of the side plate 23j of the first rotary support member 23.

Further, screw holes 23b, 23c are formed in the side plate 23j of the first rotary support member 23. These screw holes 23b, 23c are arranged at positions corresponding to the holes 14a, 14b (shown in FIG. 5) formed in the back-side surface casing member 14 and screws not shown in the drawing which are inserted into these holes 14a, 14b are threaded into these screw holes 23b, 23c. Here, a notch 37c into which a distal end of the screw which is threaded into the screw hole 23b of the first rotary support member 23 is formed in the first printed circuit board 37. Further, a screw hole 22h is formed in the side plate 22g of the second rotary support member 22. Into this screw hole 22h, a screw not shown in the drawing which is inserted into a hole not shown in the drawing which is formed in a back-side casing member 14 is threaded. That is, the rotary support body 21 is mounted on the back-side casing member 14 by the screws.

Next, the casing 12 is explained in conjunction with FIG. 5 to FIG. 7.

As shown in FIG. 5, the casing 12 is constituted by connecting a front-side casing member 13 arranged at the front side of the spokes 3 and a back-side casing member 14 arranged at the back-side of the spokes 3.

The front-side casing member 13 houses the push switches 9 to 11 and a second printed circuit board 43 on which these push switches 9 to 11 are mounted. As shown in FIG. 6, on this second printed circuit board 43, a group of external output terminals 70 formed by collectively arranging external output terminals for leading the electric signals respectively outputted from the push switches 9 to 11 to horns or blinkers not shown in the drawing and external output terminals not shown in the drawing for outputting electric signals outputted from the rotary switch 8 to the control device of the automatic transmission are formed.

Further, to the second printed circuit board 43, a second terminal 42 which is brought into contact with the first terminal 38 and inputs the electric signals which are outputted from the first terminal 38 when the front-side casing member 13 and the casing member 14 are connected. This second terminal 42 has resiliency, is resiliently brought into contact with the first terminal 38, and is mounted on the second printed circuit board 43 by way of the second terminal mounting member 43. Further, although not shown in the drawing, the second terminal 41 is connected to the external output terminal group 70 via the second printed circuit board 43.

Further, as shown in FIG. 6, a cover 44 which covers the second printed circuit board 43 is mounted on the front-side casing member 13. To the center portion of this cover 44, a reinforcing portion 45 is provided. That is, the reinforcing portion 45 bridges a space between the front-side casing member 13 and the back-side casing member 14 such that the reinforcing portion 45 divides the space into a space 59 into which the upper spoke 3 is inserted and a space 60 into which the lower spoke 3 is inserted. Due to the provision of the reinforcing portion 45, the casing 12 is reinforced (see FIG. 3).

Further, as shown in FIG. 7, a housing 15 which houses the above-mentioned rotary switch 8 is formed on the back-side casing member 14. This housing 15 has an insertion opening 15a into which the rotary switch 8 is inserted at a position facing the front-side casing member 13. Further, on an inner wall of the housing 15, first to the third slide contacts 16 to 18 are mounted, wherein these slide contacts 16 to 18 are respectively brought into slide contact with given points of the rotary switch 8, for example, the first restricting portion 23d of the first rotary support member 23, the periphery 23i of the first rotary support member 23 and the upper portion 22a of the side plate 22g of the second rotary support member 22 (shown in FIG. 4) when the rotary switch 8 is inserted into the housing 15. These first to the third slide contacts 16 to 18 constitute guides for guiding the movement of the rotary switch 8 inside the housing 15 when the rotary switch 8 is inserted. The first to the third slide contacts 16 to 18 also function as positioning portions for positioning the rotary switch 8 with respect to the housing 15.

Further, holes 14a, 14b for mounting the side plate 23j of the first rotary support member 23 using screws are formed in the outer side surface of the housing 15.

Further, in each of an upper portion of the front-side casing member 13 and an upper portion of the back-side casing member 14, a notch 61 (shown in FIG. 6) and a notch 62 (shown in FIG. 7) are respectively formed so as to form the opening 63 (shown in FIG. 3) through which the manipulating knob 19 is projected from the casing 12.

Next, the connection structure of the front-side casing member 13 and the back-side casing member 14 is explained in conjunction with FIGS. 5, 6 and 8 to 13.

The front-side casing member 13 and the back-side casing member 14 are to be connected by snap fitting. That is, a first snap pawl 46 (shown in FIG. 5) having flexibility is formed on the center of the lower portion of the back-side casing member 14, while a first engaging hole 49 (shown in FIG. 6) which catches the first snap pawl 46 is formed in a portion of the front-side casing member 13 corresponding to the first snap pawl 46.

Further, as shown in FIG. 5, in the vicinity of the first snap pawl 46, that is, to a periphery of a lower end of the back-side casing member 14, a recess, that is, an engagement releasing portion 52 in which a specific tool for releasing the engagement between the first snap pawl 46 and the first engaging hole 49 is provided.

Further, in releasing the engaging state between the first snap pawl 46 and the first engaging hole 49, when the specific tool is inserted into the engagement releasing portion 52 and a wall 49a having the first engaging hole 49 is pressed, this wall 49a is deflected and hence, the engaging state between the first engaging hole 49 and the first snap pawl 46 is released.

Further, as shown in FIG. 6, a second snap pawl 47 and a third snap pawl 48 having flexibility are respectively formed on both sides of the upper portion of the front-side casing member 13. Further, a second engaging hole 50 (shown in FIG. 5) with which the second snap pawl 47 is engaged is formed in a portion of the back-side casing member 14 corresponding to the second snap pawl 47, while a third engaging hole not shown in the drawing with which the third snap pawl 48 is engaged is formed in a portion of the back-side casing member 14 corresponding to the third snap pawl 48.

Further, a shape of the second snap pawl 47 and a shape of the second engaging hole 50 are determined such that when an external force in the direction that the lower portion of the front-side casing member 13 and the lower portion of the back-side casing member 14 are moved away from each other using a contact of the upper portion of the front-side casing member 13 and the upper portion of the back-side casing member 14 as a fulcrum is imparted to at least one of the front-side casing member 13 and the back-side casing member 14, an external force in the direction that the second snap pawl 47 is moved away from the second engaging hole 50 acts on the second snap pawl 47 from the second engaging hole 50.

For example, as shown in FIG. 8 to FIG. 10, the second snap pawl 47 includes a projection which is formed in a trapezoidal shape in the longitudinal cross-section as well as in the axial cross-section, wherein the projection is constituted of a top 47d which is formed in the vicinity of the center of the distal end and first to third oblique surfaces 47a to 47c which are formed such that the remoter the oblique surfaces from the top 47d, a plate thickness is decreased. Further, FIG. 8 is drawn such that the extension direction of the second snap pawl 47 with respect to the front-side casing member 13 is set as the vertical direction and the portion side with which the second engaging hole 50 is engaged is set as a front surface.

Further, as shown in FIG. 5, the second engaging hole 50 is formed of a rectangular hole having an opening and a depth large enough to allow the whole projection to be fitted therein in a state that the second snap pawl 47 is completely engaged with the second engaging hole 50.

That is, with respect to the second snap pawl 47 and the second engaging hole 50, when the wall 49a having the first engaging hole 49 is pressed by inserting a specific tool into the engagement releasing portion 52, the wall 49a is deflected and hence, the engaging state between the first engaging hole 49 and the first snap pawl 46 is released. Thereafter, when an external force is imparted to at least one of the front-side casing member 13 and the back-side casing member 14 in the direction that the lower portion of the front-side casing member 13 and the lower portion of the back-side casing member 14 are moved away from each other using the contact between the upper portion of the front-side casing member 13 and the upper portion of the back-side casing member 14 as a fulcrum, a ridge which constitutes a boundary between the first oblique surface 47a and the third oblique surface 47c or a ridge which constitutes a boundary between the second oblique surface 47b and a third oblique surface 47c is brought into slide contact with a periphery of the second engaging hole 50. Then, the slide contact is moved toward the top 47d and hence, a force in the direction that the second snap pawl 47 is moved away from the second engaging hole 50 acts on the second snap pawl 47 from the second engaging hole 50.

Further, in the same manner, a shape of the third snap pawl 48 and a shape of the third engaging hole are determined such that when an external force is imparted to at least one of the front-side casing member 13 and the back-side casing member 14 in the direction that the lower portion of the front-side casing member 13 and the lower portion of the back-side casing member 14 are moved away from each other using the contact of the upper portion of the front-side casing member 13 and the upper portion of the back-side casing member 14 as a fulcrum, an external force in the direction that the second snap pawl 47 is moved away from the second engaging hole 50 acts on the second snap pawl 47 from the second engaging hole 50.

For example, as shown in FIG. 11 to FIG. 13, the third snap pawl 48 includes a projection which is formed in a trapezoidal shape in the longitudinal cross-section as well as in the axial cross-section, wherein the projection is constituted of a top surface 48d which is formed at the center of the end and first to third oblique surfaces 48a to 48c which are formed such that the remoter the oblique surfaces from the top surface 48d, a plate thickness is decreased. Further, FIG. 11 is drawn such that the extension direction of the third snap pawl 48 with respect to the front-side casing member 13 is set as the vertical direction and the portion side which is engaged with the third engaging hole is set as a front surface.

Further, although not shown in the drawing, the third engaging hole is formed of a rectangular hole having an opening and a depth large enough to allow the whole projection to be fitted therein in a state that the third snap pawl 48 not shown in the drawing is completely engaged with the second engaging hole.

That is, with respect to the third snap pawl 48 and the third engaging hole, when the wall 49a having the first engaging hole 49 is pressed by inserting a specific tool into the engagement releasing portion 52, the wall 49a is deflected and hence, the engaging state between the first engaging hole 49 and the first snap pawl 46 is released. Thereafter, when a force is imparted to at least one of the front-side casing member 13 and the back-side casing member 14 in the direction that the lower portion of the front-side casing member 13 and the lower portion of the back-side casing member 14 are moved away from each other using the contact between the upper portion of the front-side casing member 13 and the upper portion of the back-side casing ember 14 as a fulcrum, a ridge which constitutes a boundary between the first oblique surface 48a and the third oblique surface 48c or a ridge which constitutes a boundary between the second oblique surface 48b and a third oblique surface 48c is brought into slide contact with a periphery of the third engaging hole. Then, the slide contact is moved toward the top surface 48d and hence, a force in the direction that the third snap pawl 48 is moved away from the third engaging hole acts on the third snap pawl 48 from the third engaging hole.

This embodiment is mounted on the steering wheel 1 in the following manner.

For example, firstly, the rotary switch 8 is assembled.

That is, the first terminal mounting member 40 on which the first terminal 38 is mounted is mounted on the terminal mounting portion 23e of the first rotary support member 23 using the screw 38b. Further, the cam member 29 is mounted on the cam member mounting portion 23f of the first rotary support member 23 using the screw 29a.

Further, the spring 32 and the driving rod 31 are arranged in the slide hole 20d formed in another end side of the manipulating knob body 20. Further, the rubber mats 33, 34 are laminated to the upper portion and the lower portion of another end side of the manipulating knob body 20. Further, the slide contact 35 is mounted on the slide contact mounting member 36 and this slide contact mounting member 36 is fitted into the fitting portion 20e of the manipulating knob body 20.

The first printed circuit board 37 is mounted on the side plate 23j of the first rotary support member 23 and the connecting portion 37b of the first printed circuit board 37 and the first terminal 38 are connected by the flexible cable 39. Next, the manipulating knob body 20 is arranged to have one side thereof to face the side plate 23j. Next, the second rotary support ember 22 is arranged to have the side plate 22g to face another side portion of the manipulating knob body 20. Here, the rod 25 is inserted into the hole 20b of the manipulating knob body 20 and the projection 25a of the rod 25 is fitted into the hole 23a formed in the side plate 23j of the first rotary support member 23. Next, another end of the first spacer 26 is mounted on the side plate 22g of the second rotary support member 22 using the screw 22c and, in the same manner, another end of the second spacer 27 is mounted on the side plate 22g of the second rotary support ember 22 using the screw 22e.

Next, the second knob cover 19b is fitted on one end side of the manipulating knob body 20 and is fixedly mounted using the screw 20c. Finally, the first knob cover 19a is connected in snap fitting with the second knob cover 19b thus completing the rotary switch 8.

The rotary switch 8 which is assembled in the above-mentioned manner is housed in the housing 15 of the back-side casing member 14. Here, the rotary switch 8 is guided by the first to third slide contacts 16 to 18 respectively at the first restriction portion 23d of the first rotary supporting member 23, the periphery 23i of the first rotary supporting member 23 and the upper portion 22a of the side plate 22g of the second rotary supporting member 22 respectively whereby the rotary switch 8 is positioned with respect to the back-side casing member 14. Then, the screws not shown in the drawing are inserted into the holes 14a, 14b formed in one side of the back-side casing ember 14 and are threaded into the screw holes 23b, 23c formed in the side plate 23j of the first rotary supporting member 23 whereby the rotary switch 8 and the back-side casing member 14 are fixed to each other by screws.

On the other hand, on the front-side casing member 13, the push switches 9 to 11, the second printed circuit board 43, the second terminal 43, the external output terminal 70 and the cover 44 are mounted.

Then, the back-side casing member 14 to which the rotary switch 8 is assembled is arranged at the back-side of the spoke 3 of the steering wheel 1 and the front-side casing member 13 on which the push switches 9 to 11 are mounted is arranged at the front side of the spoke 3 of the steering wheel 1, and the front-side casing member 13 and the back-side casing member 14 are connected to each other by snap-fitting the first snap pawl 46 with the first engaging hole 49, the second snap pawl 47 with the second engaging hole 50 and the third snap pawl 48 with the third engaging hole. Due to such an operation, mounting of the steering switch 7 for vehicle on the steering wheel 1 is completed.

This embodiment is operated in the following manner.

When a driver who grips the ring 2 of the steering wheel 1 pushes the manipulating knob 19 arranged at the left side of the steering wheel 1 to a depth side using a thumb, for example, the manipulating knob body 20 is, together with the manipulating knob 19, rotated about the rod 25 in one direction. Along with this rotation, the driving rod 31 moves from the valley to another crest of the cam face 30 while compressing the spring 32. Then, the portion of the manipulating knob body 20 to which the rubber mat 34 is laminated is brought into contact with the second restricting portion 22f of the second rotary support member 22 and hence, the rotation of the manipulating knob body 20 is restricted. Here, the slide contact 35 is brought into contact with one resistance pattern and the resistance pattern and the collector pattern are become conductive with each other and the first ON signal is outputted. Due to such a constitution, in the midst of driving at the driving range, the automatic transmission is manually shifted up.

Further, when the manipulation of the manipulating knob 19 is stopped, the driving rod 31 is moved from one crest to another valley formed on the cam face 30 by resiliency of the spring 32. Corresponding to this movement, together with the manipulating knob body 20, the manipulating knob 19 automatically returns to the neutral position whereby the rotary switch 8 assumes a switch-off state and returns to the drive range.

Further, when the manipulating knob 19 is pulled toward a driver with a forefinger, for example, the manipulating knob body 20, together with the manipulating knob 19, is rotated about the rod 25 in another direction. Along with this rotation, the driving rod 31 is moved from the valley to another crest of the cam face 30 while pressing the spring 32. Then, the portion of the manipulating knob body 20 to which the rubber mat 33 is laminated is brought into contact with the first restricting portion 23d of the first rotary support member 23 and hence, the rotation of the manipulating knob body 20 is restricted. Here, the slide contact 35 is brought into contact with another resistance pattern and hence, another resistance pattern and the collector pattern are made conductive to each other whereby the second ON signal is outputted. Due to such an operation, while driving at the driving range, the automatic transmission is manually shifted down.

Further, in this case also, when the manipulation of the manipulating knob 19 is stopped, the driving rod 31 is moved from another crest to the valley on the cam face 30 by resiliency of the spring 32 and hence, along with the movement of the driving shaft 31, together with the manipulating knob body 20, the manipulating knob 19 automatically returns to the neutral position. Due to such constitution, the rotary switch 8 assumes a switch-off state and returns to the drive range.

The following effect can be obtained by this embodiment.

This embodiment can be assembled such that, after the rotary switch 8 is housed in the housing 15 formed on the back-side casing member 14, the front-side casing member 13 and the back-side casing member 14 are respectively arranged on the respective front and back of the spoke 3, and the front-side casing member 13 and the back-side casing member 14 are connected to each other. That is, the rotary switch 8 can be assembled independently from the casing 12 and hence, the manipulating knob 19, the rotary support body 21, the biasing means and the signal changeover means can be easily assembled to the casing 12 whereby the assembling efficiency can be enhanced.

Further, in this embodiment, the rotary switch 8 which is inserted into the housing 15 of the back-side casing member 14 is guided respectively by the first to the third slide contacts 16 to 18 at the first restricting portion 23d of the first rotary support member 23, the front end 23i of the first rotary support member 23 and the side plate 22g of the second rotary support member 22 respectively and is positioned with respect to the back-side casing member 14, and hence, the rotary switch 8 can be inserted smoothly to the casing 12 and can be arranged with high accuracy. Accordingly, the assembling efficiency can be enhanced also from this aspect.

Further, in this embodiment, by forming the housing 15 in the back-side casing member 14, a rate that the steering switch for a vehicle 7 occupies with respect to a space of the front side of the steering wheel 1 can be made small. Accordingly, the steering switch for a vehicle 7 can hardly be an obstacle in the space of the front side of the steering wheel 1.

Further, in this embodiment, since the insertion opening 15a for inserting the rotary switch 8 into the housing 15 is formed at the position which faces the front-side casing member 13, the assembly of the rotary switch 8 to the back-side casing member 14 and the assembly of the front-side casing member 13 to the back-side casing member 14 can be performed from the same direction. Accordingly, the rotary switch 8 and the front-side casing member 13 can be easily assembled to the back-side casing member 14 whereby the assembling efficiency can be enhanced also from this aspect.

Further, in this embodiment, the manipulating knob body 20 has the bend and, using the bend as the reference, the manipulation portion is formed on one end side and the biasing means is mounted on another end side. Further, the first printed circuit board 37 of the signal changeover means is arranged parallel to the rotating direction of the manipulating knob body 20 and, at the same time, is mounted on the side plate 23j which is arranged on one side of the manipulating knob body 20. Accordingly, the manipulating knob 19 and the biasing means and the signal changeover means can be combined compactly and can be miniaturized. Accordingly, the rotary switch 8 can be arranged without restricting the mounting space for the push switches 9 to 11. At the same time, when switches other than the steering switch for a vehicle 7 are mounted on the steering wheel, the switches can be mounted without receiving the restriction for the mounting space.

Further, in this embodiment, the cam member 29 is mounted detachably on the first rotary support member 23 using the screw 29a and hence, at the time of changing setting of an operational feeling which is imparted to an operator while operating the manipulating knob 19, the existing cam member 29 can be easily replaced with another cam member having a different cam face shape. Accordingly, the degree of freedom in the selection of the operational feeling can be improved.

Further, in this embodiment, the first printed circuit board 37, the manipulating knob body 20, the second rotary support member 22 can be assembled to the first rotary support member 23 from the same direction. Alternatively, with respect to the second rotary support member 22, the second rotary support member 22 on which the manipulating knob body 20 and the first printed circuit board 37 are mounted can be assembled from the same direction. Accordingly, the assembly efficiency can be also enhanced from this aspect.

Further, in this embodiment, the first, the second spacers 26, 27 are formed between the first rotary support member 23 and the second rotary support member 22 and one ends of these first and second spacers 26, 27 are fixed to the side plate 23j of the first rotary support member 23 and another ends of the first and second spacers 26, 27 are mounted on the side plate 22g of the second rotary support member 22 using screws. Accordingly, the relative positioning between the first rotary support member 23 and the second rotary support member 22 and joining them together can be performed simultaneously. Accordingly, the assembly efficiency can be also enhanced from this aspect.

Further, in this embodiment, the second printed circuit board 43 and a group of external output terminals 70 are formed on the front-side casing member 13 and hence, the wiring work within the casing 12 can be performed collectively at the front-side casing member 13 side. At the same time, the first terminal 38 and the second terminal 42 can be connected by joining the front-side casing member 13 and the back-side casing member 14 and hence, the connection of the rotary switch 8 to the wiring formed on the front-side casing member 13 side is facilitated.

Further, in this embodiment, with the provision of the group of external output terminals 70, the wiring work between the rotary switch 8 and the control device of the automatic transmission and the wiring work between the push switches 9 to 11 and the horn or the blinker can be effectively performed. Accordingly, the steering switch for a vehicle 7 having switches 8 to 11 can be easily mounted on the steering wheel 1 from this aspect.

Further, in this embodiment, the second terminal 42 has resiliency so that the first terminal 38 and the second terminal 42 can have a stable contact state and hence, the transmission of the electric signals from the first terminal 38 to the second terminal 42 can be reliably performed.

Further, in this embodiment, the second snap pawl 47, the second engaging hole 50, the third snap pawl 48 and the third engaging pawl are arranged on the upper portion of the casing member 12, while the first snap pawl 46 and the first engaging pawl 49 are arranged on the center of the lower portion of the casing 12 and hence, the front-side casing member 13 and the back-side casing member 14 are connected. Further, the engagement releasing portion 52 for releasing the engagement state of the first snap pawl 46 and the first engaging hole 49 is arranged. Accordingly, in the disassembling work, after releasing the engagement state of the first snap pawl 46 and the first engaging hole 49 at the lower portion of the casing 12, by rotating the lower portion of the front-side casing member 13 and the lower portion of the back-side casing member 14 in the direction opposite to each other using the contact of the front-side casing member 13 and the back-side casing member 14 at the upper portion of the casing 12 as a fulcrum, the engagement state between the second, the third snap pawls 47, 48 and the second, third engaging holes 50, 51 can be easily released and hence, the disassembling of the casing 12 is facilitated. Accordingly, without breaking the casing 12, it is possible to cope with mechanical troubles or electrical troubles which may occur in the casing 12.

Further, in this embodiment, the casing 12 is provided with not only the second snap pawl 47, the second engaging hole 50, the third snap pawl 48 and the third engaging hole but also with the first snap pawl 46 and the first engaging hole 49. Accordingly, when the casing 12 is not disassembled, the front-side casing member 13 and the back-side casing member 14 are firmly connected to each other and hence, the strength of the casing 12 can be enhanced.

Further, in this embodiment, although the explanation is made with respect to a case in which the rotary switch 8 performs the changeover control between shift-down and shift-up, the present invention is not limited to such an application. For example, the rotary switch 8 is applicable to other changeover control such as the changeover of setting of auto-cruising, the changeover of the mute of the audio equipment and the like.

Further, in this embodiment, although the second terminal 42 which is formed on the front-side casing member 13 has flexibility, the present invention is not limited to such a constitution. That is, there may be a case in which the first terminal 38 has flexibility and the second terminal 42 has no flexibility or a case in which both of the first terminal 38 and second terminal 42 have flexibility.

Further, in this embodiment, the projection of the second snap pawl 47 has the top 47d and the first to third oblique surfaces 47a to 47c, while the projection of the third snap pawl 48 has the top surface 48d and the first to third oblique surfaces 48a to 48c. However, the present invention is not limited to such a constitution. That is, as shown in FIG. 10 or FIG. 13, any projection can be used provided that the projection has oblique surfaces such that the plate thickness is decreased from a distal end to a bottom of the snap pawl.

Further, in this embodiment, although the respective spokes 3 are formed on both sides of the left and right of steering wheel 1, any one of the spokes 3 may be omitted.

As has been described heretofore, according to the steering switch for a vehicle of the first invention of the present inventions, in mounting the manipulating knob to the support member, since the support member and the rotary support body are provided as separate members, the manipulating knob is mounted on the rotary support body and, thereafter, the rotary support body on which the manipulating knob is mounted can be mounted on the support member. Further, since one end of the rod is fixedly mounted on one of the first rotary support member and the second rotary support member, the manipulating knob and the second rotary support member can be assembled from the same direction with respect to the first rotary support member. Alternatively, the manipulating knob and the first rotary support member can be assembled from the same direction with respect to the second rotary support member. Due to such constitutions, the manipulating knobs can be easily mounted with respect to the support member. Accordingly, the assembling property can be enhanced compared to the prior art.

According to the steering switch for a vehicle of the second invention of the present inventions, an assembled body which is constituted of an integral body formed of the manipulating knob, the rotary support body, biasing means and signal changeover means is housed in the housing provided to one of the front-side support and the back-side support and the front-side support and the back-side support are arranged at the front and back sides of the spokes and are connected to each other. That is, the manipulating knob, the rotary support body, the biasing means and the signal changeover means can be assembled independently from the support member and hence, the manipulating knob, the biasing means and the signal changeover means can be easily assembled to the support member. Accordingly, the assembling property of the steering switch for a vehicle can be enhanced.

Still further, according to the steering switch for a vehicle of the third invention of the present inventions, the bend is formed on the manipulating knob body, the manipulating portion to which the manipulating force is imparted by the manipulator is provided to one end side of the manipulating knob body using the bend as the reference. Further, the printed circuit board of the signal changeover means is arranged parallel to the rotational direction of the manipulating knob body and, at the same time, is mounted on the side plate which is positioned at the side of the manipulating knob body and hence, the manipulating knob, the biasing means and the signal changeover means can be assembled in a compact form. Accordingly, the steering switch for a vehicle can be miniaturized whereby such a steering switch can be mounted on the steering wheel without restricting a mounting space for other switches which are mounted on the steering wheel.

Still further, according to the steering switch for a vehicle of the fourth invention of the present inventions, since the first, the second external output terminals and the second switch are mounted in another casing member, it is possible to collectively perform the wiring work in another casing member and, at the same time, the first terminal and the second terminal can be connected to each other by joining the front-side casing member and the back-side casing member and hence, the connection of the first switch with respect to the wiring provided to another casing member can be easily performed whereby the wiring work can be performed easily. Accordingly, the steering switch for a vehicle which includes a plurality of switches can be easily mounted on the steering wheel.

Still further, according to the steering switch for a vehicle of the fifth invention of the present inventions, at the time of disassembling, for example, an operator grasps the front-side casing member and the back-side casing member respectively with his fingers and imparts an external force which is equal to or more than a given force in the direction to make the front-side casing member and the back-side casing member move away from each other whereby the joined state of the front-side casing member and the back-side casing member due to the snap joining portion can be released. Accordingly, the joined state of the front-side casing member and the back-side casing member can be easily disassembled and hence, it is possible to cope with mechanical troubles and electrical troubles of the switches without breaking the casing.

What is claimed is:

1. A steering switch for a vehicle comprising:
   a support member mounted on a steering wheel, the steering wheel having an annular ring and a spoke formed inside the ring;
   the support member formed by joining a front-side casing member arranged at a front side of the spoke, and a back-side casing member arranged at a back side of the spoke;
   a manipulating knob rotatably supported on the support member and rotatable about a pivot for rotation in front and rear directions relative to the steering wheel, the manipulating knob configured to project inside an area of the steering wheel defined within the ring;
   the support member having a first opening configured to receive the spoke so as to mount the front-side casing member and the back-side casing member, and the support member having a second opening to permit the manipulating knob to project therethrough;
   a rotary support body mounted on the support member and configured to rotatably support the manipulating knob;
   the manipulating knob further including a manipulating knob body rotatable about the pivot, where the manipulating knob body includes first and second arms extending from the pivot, wherein the first and second arms are disposed at an angle with respect to one another to form a bent portion, wherein the first arm extends from the pivot to form an operational portion that facilitates user operation of the manipulation knob, and wherein the second arm extends from the pivot to form a biasing portion that facilitates biasing of the manipulating knob to return to a neutral position;
   signal changeover means having a printed circuit board and a slide contact mounted between the pivot and the operational portion and capable of changing over two types of electric signals in response to a rotational movement of the manipulating knob from the neutral position, and the slide contact configured to slide relative to the printed circuit board during rotational movement of the manipulating knob; and
   wherein the manipulating knob, the manipulating knob body, the rotary support body, the biasing portion, and the signal changeover means are formed as an integral assembly.

2. A steering switch for a vehicle according to claim 1, wherein the housing has a positioning portion on an inner wall of the housing, the assembled body being insertable into the housing so as to position the assembled body with respect to the housing.

3. A steering switch for a vehicle according to claim 1, wherein the housing is formed on the back-side casing member.

4. A steering switch for a vehicle according to claim 3, wherein the front-side casing member and the back-side casing member are directly connected to at least one spoke.

5. A steering switch for a vehicle according to claim 3, wherein the housing has an insertion opening for inserting the assembled body into the housing at a position which faces the front-side casing member.

6. A steering switch for a vehicle according to claim 1, wherein the spoke comprises an upper spoke and a lower spoke that extends through the support member.

7. A steering switch for a vehicle according to claim 6, wherein the support member includes a reinforcing portion which divides the first opening into a upper space corresponding to the upper spoke and a lower space corresponding to the lower spoke and bridges between the front-side casing member and the back-side casing member so as to reinforce the support member.

8. A steering switch for a vehicle according to claim 1, wherein the front-side casing member and the back-side casing member of the support member are connected by snap fitting.

9. A steering switch for a vehicle according to claim 1, wherein
the rotary support body has side plates at opposite sides of the manipulating knob body;
the bent portion includes a hole defining the pivot; and
a rod extends through the hole of the bent portion such that each end of the rod is correspondingly fixed to a side plate of the rotary support body.

10. A steering switch for a vehicle according to claim 1, wherein the printed circuit board is disposed facing a side portion of the bent portion and is arranged in a plane having a normal that is generally parallel to an axis of rotation of the manipulating knob as defined by the pivot; and wherein a slide contact is attached to the manipulating knob such that the slide contact is slidable on the printed circuit board.

11. A steering switch for a vehicle according to claim 1, wherein:
the signal changeover means includes a first terminal for outputting two types of signals to components external to the switch;
the front-side casing member includes the printed circuit board having a plurality of switches; and
the printed circuit board has a second terminal which is connected to the first terminal when the front-side casing member and the back-side casing member are connected.

12. A steering switch for a vehicle according to claim 1, wherein the biasing means includes:
a spring;
a driving rod biased by the spring, wherein the spring and the driving rod are disposed in a slide hole provided at the second end side of the manipulating knob body; and,
a cam member having a cam face with which the driving rod is in pressure contact.

13. A switch for a steering wheel of a vehicle comprising:
a support member that is mounted on a steering wheel, the steering wheel having an annular ring and a spoke formed inside the ring;
wherein the support member comprises:
a front-side casing member that is disposed at a front side of the spoke;
a back-side casing member that is disposed at a back side of the spoke, the front-side casing member being connected to the back-side casing member around the spoke;
a manipulating knob that is rotatable about a pivot, wherein the pivot is aligned in a direction that is generally parallel to the spoke, wherein the manipulating knob protrudes from an opening in a top of the support member and the opening is at least partially surrounded by the front-side and back-side casing members; and
the manipulating knob further including a manipulating knob body rotatable about the pivot, where the manipulating knob body includes first and second arms extending from the pivot, where the first and second arms are disposed at an angle with respect to one another to form a bent portion, the first arm extending from the pivot to form an operational portion that facilitates user operation of the manipulation knob, the second arm extending from the pivot to form a biasing portion that facilitates biasing of the manipulating knob to return to a neutral position.

14. A steering switch for a vehicle according to claim 13, wherein the spoke comprises an upper spoke and a lower spoke that extend through the support member.

15. A steering switch for a vehicle according to claim 14, wherein the support member includes a reinforcing portion which divides the first opening into an upper space and a lower space and which bridges between the front-side casing member and the back-side casing member so as to reinforce the support member; and
wherein the upper spoke extends through the upper space and the lower spoke extends through the lower space.

* * * * *